United States Patent [19]

Nunes

[11] 3,807,505
[45] Apr. 30, 1974

[54] SOD HANDLING MACHINE AND METHOD

[76] Inventor: John F. Nunes, 2006 Loquot Ave., Patterson, Calif. 95363

[22] Filed: Nov. 10, 1972

[21] Appl. No.: 305,241

Related U.S. Application Data

[63] Continuation of Ser. No. 70,728, Nov. 10, 1970, abandoned.

[52] U.S. Cl. .................................. 172/20, 83/925 R
[51] Int. Cl. ............................................. A01b 45/04
[58] Field of Search ............. 172/1, 19, 20; 83/110, 83/175, 146, 630, 566, 568, 925 R

[56]  References Cited
UNITED STATES PATENTS

| 2,617,347 | 11/1952 | Provost | 172/20 |
| 3,889,878 | 6/1959 | White et al. | 172/20 |
| 3,509,789 | 5/1970 | Dye | 83/925 R |
| 1,516,561 | 11/1924 | Best | 172/20 |
| 3,519,082 | 7/1970 | Miner | 172/20 |
| 2,532,672 | 12/1950 | Michael | 83/630 |
| 3,524,374 | 8/1970 | Diolot | 83/630 |
| 3,574,291 | 4/1971 | Rosendahl | 83/175 |
| 3,587,376 | 6/1971 | Hirano et al. | 83/110 |
| 1,534,687 | 4/1925 | Collier | 83/110 |

Primary Examiner—Stephen C. Pellegrino
Attorney, Agent, or Firm—Flehr, Hohbach, Test, Albritton & Herbert

[57] ABSTRACT

A machine for engaging pre-cut sod and carrying the sod to a cutting station where a sod cutter attacks the sod from the root surface of the sod while an anvil engages the foliage surface of the sod at a position opposite to the cutter. After the sod has been severed by the cutter, the leading portion of sod is moved relatively away from the trailing portion so as to disentangle intermingled foliage of the two adjacent portions.

2 Claims, 8 Drawing Figures

SOD HANDLING MACHINE AND METHOD

This is a continuation, of U.S. Pat. application Ser. No. 70,728, filed Sept. 9, 1970, now abandoned.

BACKGROUND OF THE INVENTION

This invention pertains to a sod handling machine for cutting a ribbon of sod into predetermined lengths, and to a method for accomplishing same.

Various sod harvesting machines have heretofore been employed for cutting a field of sod into a number of laterally disposed, relatively long, undercut ribbons of sod severed from their roots whereby the sod lies ready to be rolled or otherwise harvested. Heretofore, these elongated ribbons of pre-cut sod have been cut into short lengths by machinery which serves to drive a blade downwardly into the ground entering through the foliage of the sod and subsequently passing through the reverse surface thereof so that the sod can be picked up in short lengths.

The foregoing approach, obviously, does not lend itself to harvesting long, continuous ribbons of sod mechanically since the sod cutter must slice into the sod ribbon from the foliage surface side of the sod. Thus, the blade first encounters the considerable resistance of the foliage before it has an opportunity to enter the earthen or root portion of the sod.

It has, therefore, long been desirable in the mechanical harvesting of sod to provide means for engaging an elongated ribbon of sod lying pre-cut in a field and, after engaging the ribbon with a machine, to then sever the ribbon into short lengths thereof continuously.

SUMMARY OF THE INVENTION AND OBJECTS

In general, there is provided a sod handling machine including means serving to convey a ribbon of sod along a predetermined path in combination with cutting means located in the path which includes a movable blade disposed to move into the sod from a disposition on the reverse surface of the sod from the foliage so as to first encounter the root portion of the sod so as to more easily sever the ribbon of sod. In addition, the leading severed portion of the ribbon of sod is drawn away from the trailing portion at a rate greater than the rate at which the sod is supplied along the path of the machine so as to readily separate intertwined foliage of adjacent portions of the sod after severing.

It is a general object of the present invention to provide an improved sod handling machine characterized by improved cutting means for severing sod into predetermined lengths thereof.

It is another object of the invention to provide a sod cutting machine suitable for incorporation into sod harvesting apparatus for picking an elongated ribbon of sod from a field thereof and severing same into a number of predetermined lengths as it is being harvested.

It is a further object of the invention to provide an improved method of handling elongated ribbons of sod to cut them into predetermined lengths during harvesting or at other times during handling of same.

The foregoing and other objects of the invention will be more clearly apparent from the following detailed description of a preferred embodiment according to the invention.

DETAILED DESCRIPTION OF A PREFERRED EMBODIMENT

Figures 1, 2:
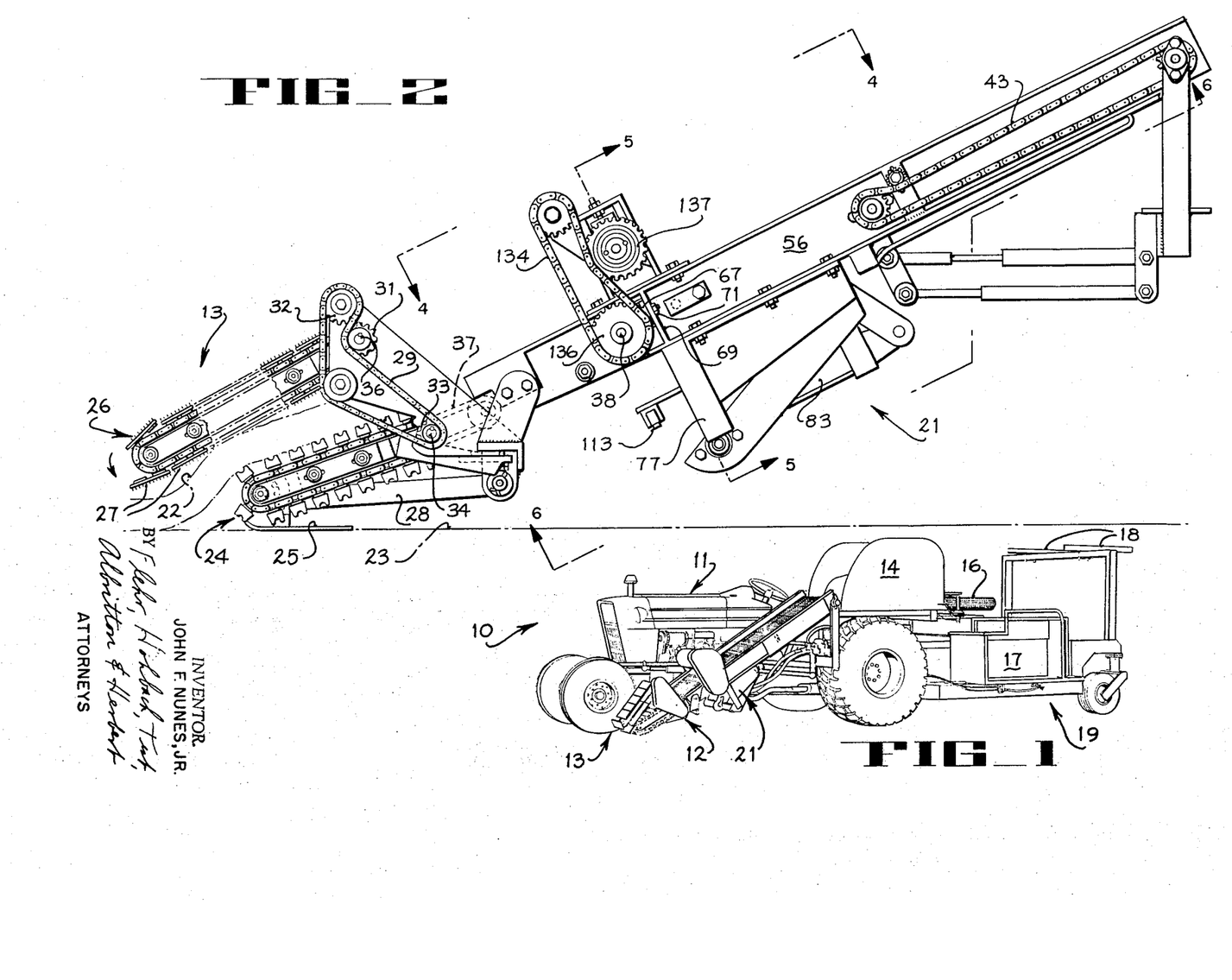
FIG. 1 is a perspective view of sod harvesting apparatus according to the invention.
FIG. 2 is a side elevation view, with covers removed, of sod handling apparatus for cutting sod into predetermined lengths according to the invention.

A sod harvesting machine 10 is shown in FIG. 1 and includes, in general, a tractor vehicle 11 upon which is mounted, at its left side, a sod conveying assembly 12. The lower end of assembly 12 carries a sod pick-up assembly 13 such as of a type shown and described in copending U.S. Pat. application Ser. No. 807,594, now U.S. Pat. No. 3,664,432. The upper end of sod conveying assembly 12 discharges into a sod rolling station 14 of a type, for example, as shown in U.S. Pat. No. 3,429,377. Sod discharged from the rolling station 14 is placed upon a transversely extending conveyor 16 where rolls of sod can be handled by workmen standing in work stations 17, as disclosed and described in U.S. Pat. No. 3,415,399.

As disclosed in the last named patent, the rearward portion of the vehicular assembly shown in FIG. 1 includes a pallet carrier vehicle for mobilized loading thereof as sod is picked up and rolled during movement of the entire harvesting machine 10 across a field of sod. Pallets are carried on the racks 18 and are placed by hand within the space formed between the two work stations 17 (only one of which is shown) located at the sides of the pallet carrier vehicle portion 19.

Thus, in general, the sod harvesting machine 10 as shown in FIG. 1 serves to pick up lengths of sod at the lower end of the conveyor assembly 12, carry them upwardly into the roll forming station 14, discharge the rolls onto the transversely moving conveyor 16 and workmen in the work stations 17 then place the rolls of sod onto pallets carried in the pallet carrier vehicle portion 19 of machine 10.

As disclosed in greater detail further below, machine 10 includes, as now to be described, means for cutting an elongated ribbon of sod into predetermined lengths as the sod is fed upwardly along the sod conveying assembly 12. In general, in FIG. 1, this structure is shown as the sod cutting assembly 21.

Means serving to engage a ribbon of sod 22 to convey it upwardly from the ground 23 or other support surface includes the sod pick-up assembly 13 wherein a lower cyclic carrier 24 rides in closely spaced relation above the supporting surface 23 by means of a support ski 25 whereby the upwardly moving leading portion of carrier 24 engages the transverse edge of a length of sod 22 to nudge it upwardly so as to initiate upward lifting of the leading edge of the sod.

A cyclically trained hold-down carrier 26 is disposed above the region of the initial lifting of the edge of the sod 22 so as to form rearwardly moving back-up surface portions 27 against which carrier 24 can direct the sod at the time of initiating the upward lifting of the sod. The back-up portions such as the shoes 27 along with the upper reach of carrier 24 serve to positively withdraw the sod and advance it upwardly along inclined conveyor assembly 12.

To permit the leading end of carrier 24 to follow the contour of the ground, ski 25 is carried on the end of a support arm 28 pivoted at its right end (as shown).

A chain belt 29 engages suitable sprockets 31, 32, 33 for driving shafts 34, 36 respectively to operate carriers 24, 26. Shaft 34, in turn, is operated by a drive belt 37. Drive belt 37 is, in turn, operated by coupling to a power take-off portion of shaft 38 which, in turn, is driven by the hydraulic motor 39 connected to shaft 38 by a chain belt 41.

In addition, hydraulic motor 39 directly connects to a drive shaft 42 extending transversely of conveyor assembly 12 for driving another chain belt 43 so as to operate the cyclically disposed, continuous conveyor belt 44, preferably of an open mesh style serving to permit rocks, pebbles and other objectionable items to drop readily therethrough.

The cyclic conveyor belt 44 is trained about a pair of rollers 46, 47. Roller 46 carries, fixed thereto, sprockets 48 disposed along its length for engaging conveyor belt 44 for positively advancing belt 44 under driving of hydraulic motor 39.

Another cyclic conveyor belt 49 is trained about a pair of transversely extending rollers 51, 52 whereby roller 52 can also carry sprockets 55 for positively driving conveyor 49. Means for driving conveyor 49 include the chain belt 41, previously described, trained about sprocket 55 affixed to a transversely extending shaft 38 for rotating roller 52.

By suitably selecting the gear ratios between the size of sprockets driving rollers 52 and 46, conveyor 44, driven by the same hydraulic motor 39 as drives conveyor 49, serves to advance the upper reach or conveying surface of conveyor 44 somewhat faster than conveyor 49.

The upper reaches of each of conveyors 44 and 49 are underlaid by a supporting plate 53, 54, respectively, for supporting sod being carried thereon.

At this point, it will be readily apparent that hydraulic motor 39 serves to drive, via chain belts 41 and 43, the two tandemly disposed conveyor belts 44, 49 for carrying sod upwardly along assembly 12 and that by suitably coupling the drive belt 37 to the outer end of shaft 38, the cyclic carriers 24, 26 of pick-up assembly 13 are similarly driven to pick up and carry sod upwardly onto the upper reach of carrier 24. Thereafter sod is advanced onto carrier 49 and then to carrier 44. Carrier 44, it is to be recalled, is being "overdriven" relative to the speed of advance of the remaining carriers in the system so as to apply a modest tug to the sod moving upwardly in the predetermined path defined by assembly 12.

While not specifically mentioned heretofore, the side framework of assembly 12 includes a pair of laterally spaced apart rigid steel members 56, 57 arranged to be pivotally supported at their upper end from a substantially stationary, transverse box frame member 58. In order to lift the lower end of assembly 12 upwardly clear of obstructions and otherwise, hydraulic ram 59 is connected via a clevis assembly 61 secured to a transversely extending box-shaped spacer member 62. The lower end of clevis 61 is also coupled to a telescopically arranged shock absorbing unit 63.

Figure 6:
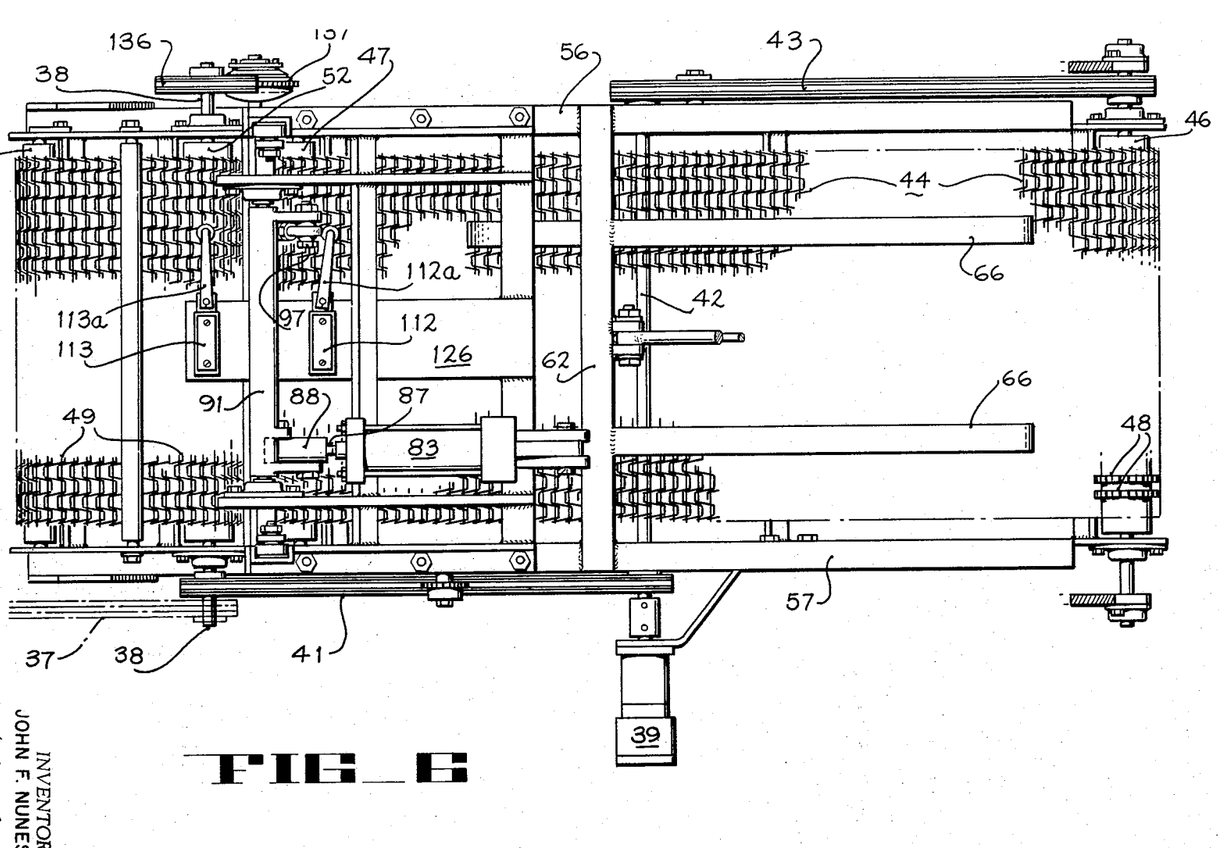
FIG. 6 is an enlarged bottom view of that portion of FIG. 2 taken along the line 6—6 thereof.

The lower reach of conveyor 49 is supported by a transverse roller 64 while the lower reach of conveyor 44 is supported by a pair of elongated spring members 66 (FIGS. 3 and 6) carried by the transversely extending box-shaped spacer member 62.

The upwardly inclined conveyors 49, 44 flank a cutter lying below the path of the sod, for severing the upwardly moving ribbon of sod into predetermined lengths thereof as now to be described.

Accordingly, a reciprocating movable blade 66, having a cutting edge 66a, rides against a flat guide surface formed by a stationary blade guide member 67. The ends of member 67 extend through openings 68 formed in each of the rigid frame members 56, 57 whereby the outer ends of guide member 67 can be bolted to the upwardly extending webs 69 (FIG. 2) formed between the flanges of channel members 56, 57. Thus, nuts 71 (FIGS. 2 and 5) secure the bolts which extend through the outer ends of blade guide member 67. Edge 66a normally lies at a level below the upper edge of member 67. In this way, the upper edge of 66a of blade 66 is protected against being scraped by the rough underside of sod being conveyed along the upper reaches of conveyors 49, 44.

Means for guiding blade 66 between retracted and advanced positions in a closely confined plane includes the transversely extending blade mounting bar 72 (FIG. 3) secured to the under edge of blade 66. Bar 72 is formed at its opposite ends (FIG. 5) with downwardly depending extensions 72a, 72b, each of which carries a pair of guide rollers 73, 74, respectively. Guide rollers 73, 74 ride along a confining channel 76, 77, respectively, so as to closely confine movement of blade 66. Channels 76, 77 are formed in downwardly depending channel bar members secured firmly by bolts to the underside of frame members 56, 57.

As thus arranged, it will be readily apparent that blade 66 is arranged to be closely guided as it moves between advanced and retracted positions into and out of the plane of the sod being conveyed by the upper reaches of conveyors 49, 44.

Figure 5:
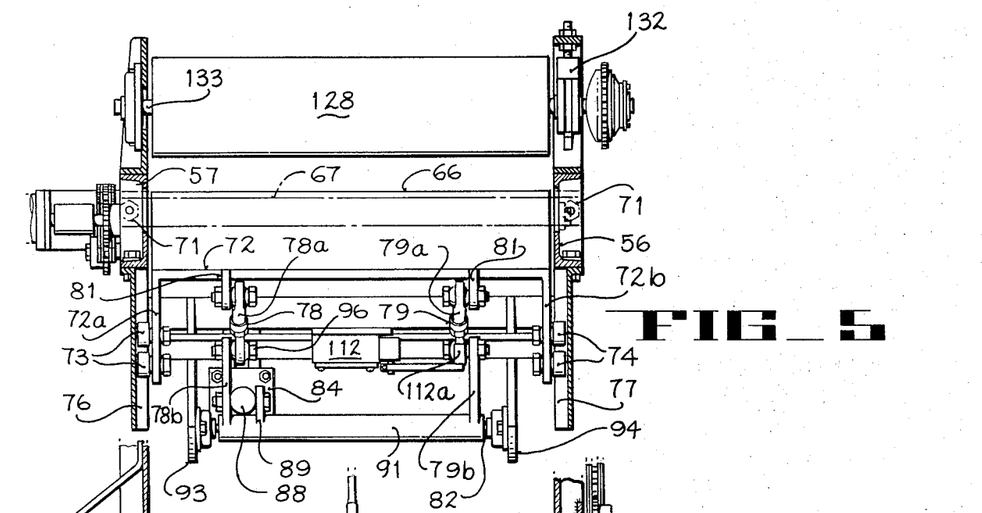
FIG. 5 is an end elevation view in section taken along the line 5—5 of FIG. 2.

Means for moving blade 66 into and out of the plane of the sod includes a pair of over-center linkages 78, 79, each of which include an upper link 78a, 79a, respectively, pivotally coupled at its upper end to a downwardly depending bracket 81 (FIG. 5).

Figure 3:
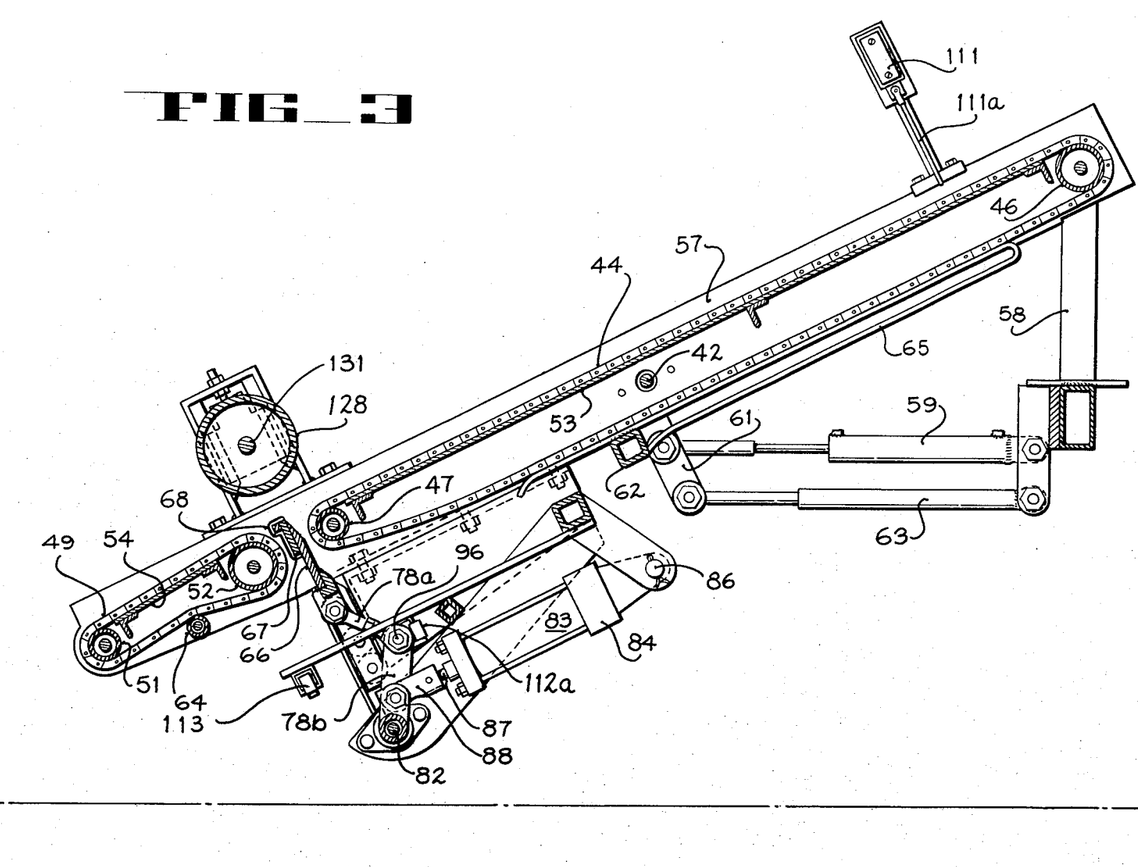
FIG. 3 is an enlarged side elevation view, in section, of sod handling apparatus taken substantially along the centerline thereof and in condition ready to initiate an upward cutting stroke.
Figure 4:
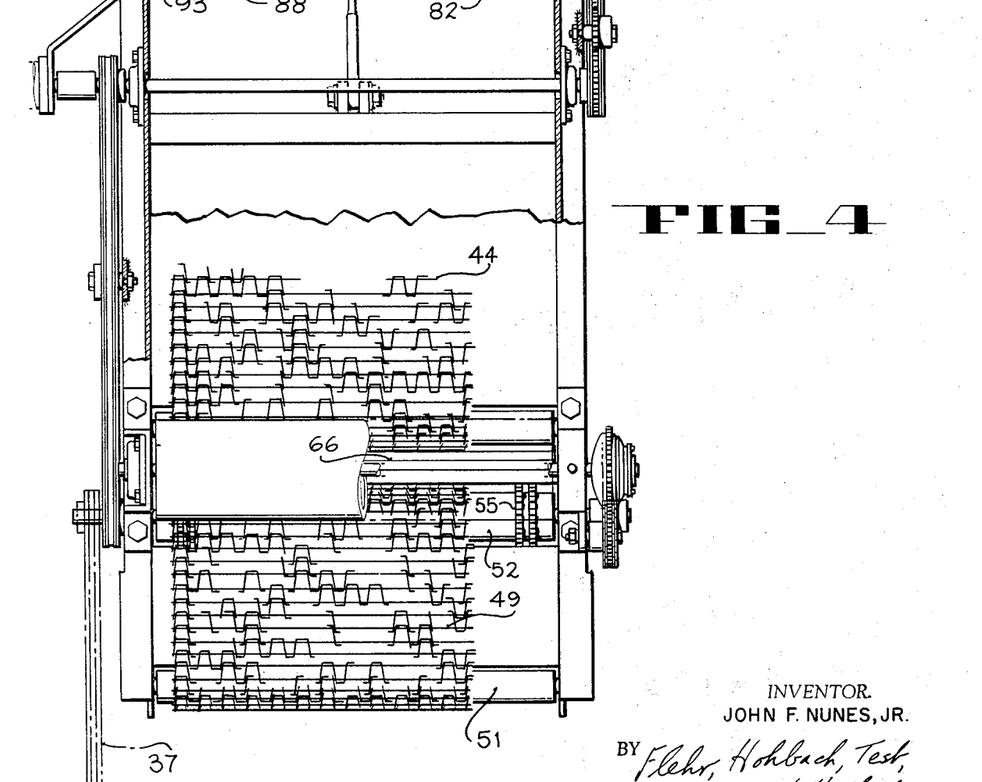
FIG. 4 is an enlarged plan view, partially broken away, taken along the line 4—4 of FIG. 2.

Each linkage 78, 79 also includes a lower link 78b, 79b, respectively, pivotally connected at its upper end to the lower end of its associated link 78a or 79a, as the case may be to form a knuckle 96, 97 and pivoted at its lower end about a pivot axis 82 (FIG. 3).

Means for driving linkages 78, 79 simultaneously to move the edge 66a of blade 66 into and out of the path of sod moving upwardly along the conveyor include the hydraulic actuator 83 in the form of a double acting piston carried by a mounting assembly 84 from a pivot pin 86. The actuator shaft 87 carries a connector element 88 adapted to be pivotally bolted between link 78b and an upstanding stub link 89 extending upwardly from a transversely extending rocker 91.

Thus, rocker 91 is pivotally carried upon pivot axis 82 extending transversely between the two downwardly depending hanger members 93, 94 whereby, upon actuation of the actuator piston, rod 87 can be extended to cause links 78b and 79b to move to the left as shown in FIG. 3 thereby causing the intermediate piston points or knuckles 96, 97 to be moved forwardly serving to raise blade 66 upwardly toward the plane of sod moving along the path of conveyors 44, 49.

In order to provide relatively high speed operation of the cutting blade 66 as driven by the double acting actuator 83, the displacement of the piston 83a within actuator 83 is such that the lower links 78b, 79b move "over center" (i.e, the blade reaches maximum displacement at mid-stroke) thereby withdrawing the blade 66 during the second half of each stroke of the piston.

Figure 8:
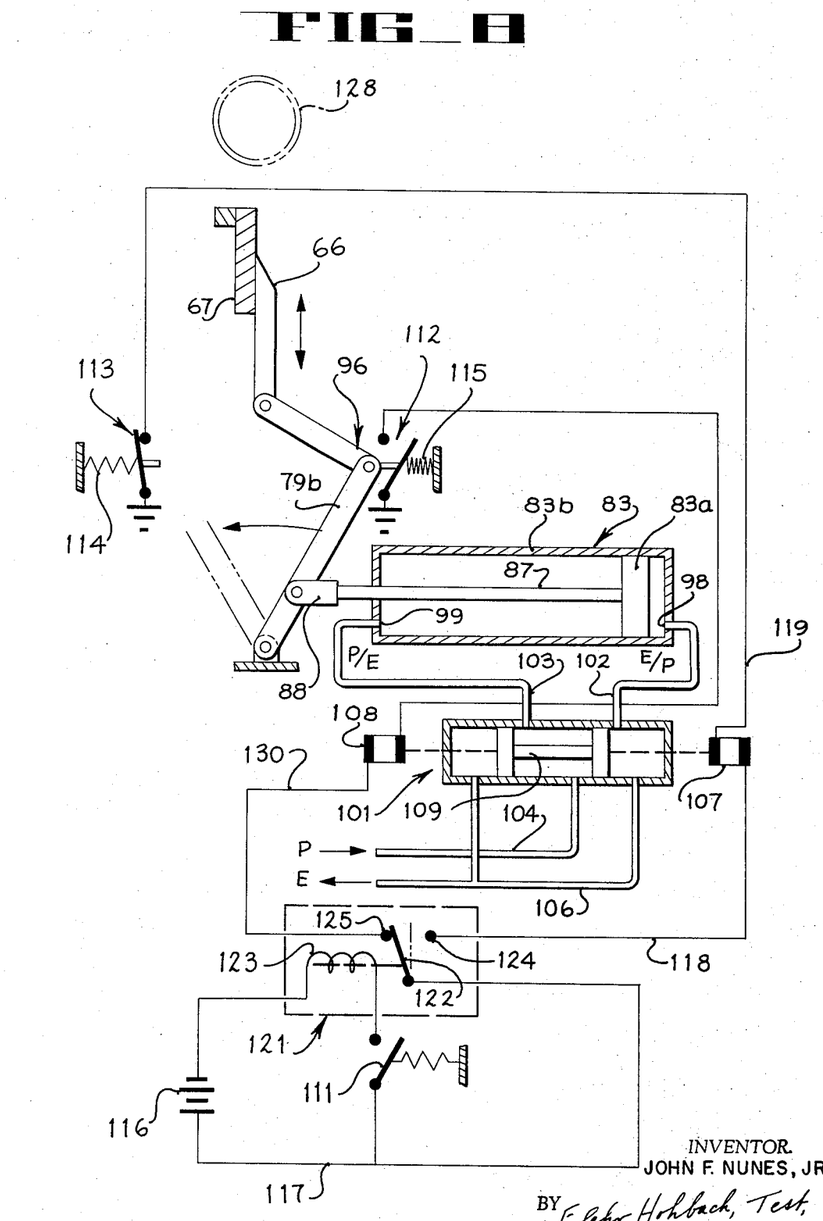
FIG. 8 shows a schematic system diagram for operating the sod cutter blade actuator.

A suitable system for operating actuator 83 in this manner is shown in FIG. 8 as now to be described.

Thus, actuator 83 includes a piston 83a connected to piston rod 87 and movable between the opposite ends of cylinder 83b. At each end of cylinder 83b, fluid passages 98, 99 are provided for admitting fluid under pressure and exhausting fluid as desired. It is to be understood that in the double acting mode of actuator 83, one of the passages 98, 99 will be connected to exhaust while the other is connected to pressure, and vice versa, whereby use of a simple four-way spool valve 101 serves to alternately connect the lines 102, 103 to pressure or exhaust. Fluid under pressure is supplied to spool valve 101 via the line 104 connected to a source of fluid under pressure represented simply by the initial "P." Openings in valve 101 exhaust fluid from the system via line 106.

As thus arranged, a pair of solenoids 107, 108 alternately serve to position the spool 109 of valve 101 in response to alternate strokes of piston 83a.

Accordingly, on alternate strokes of piston 83a, one or the other of the two solenoids 107, 108 will be "enabled," i.e., conditioned for energization, while the other of the two solenoids will be "disabled" whereby closure of a control switch 111 in common with both solenoids can serve to activate the solenoid which has been "enabled." As disclosed herein, it is assumed solenoids 107, 108 are of the "pull" type wherein, upon energizing them, their armatures are pulled inwardly.

Accordingly, as shown in FIG. 8, when piston 83a has been moved to the right as shown in that diagram, one of two direction control switches 112, 113 will be opened while the other moves to its normally closed condition by means of a spring 114 attached to the switch armature. In this condition, solenoid 107 has been "enabled" whereby it can be energized simply by closure of switch 111 to complete a circuit traced from a power supply, shown simply as the battery 116.

Thus, a stepping relay 121 is schematically shown of known style wherein a switch contact 122 is schematically shifted between bistable states in response to energizing a coil 123 as a result of each closure of switch 111 as the latter is closed upon being contacted by the leading edge of a slab of sod being carried upon belt 44. Closure of switch 111 completes a circuit from battery 116 via lead 117, switch 111, coil 123 and return to batterly 116 so as to shift switch contact 122 to the contact point 124. This transfer of contact 122 serves to energize solenoid 107 (now in its "enabled" state) via a circuit traced from battery 116, lead 117, contact 122, point 124, lead 118, solenoid 107, lead 119, and switch 113 (now closed) to ground.

When solenoid 107 is thus energized, spool 109 will be transferred to interchange the fluid connections to actuator 83 whereby piston 83a will be driven leftward (FIG. 8) causing blade 66 to be moved upwardly and then downwardly. This leftward movement of piston 83a serves to close switch 112 (under the action of spring 115) and to open switch 113 whereby solenoid 108 will be "enabled" upon initial movement of piston 83a and solenoid 107 "disabled" at the end of the piston's stroke.

Similarly, in response to the next slab of sod encountering switch 111 solenoid 108 will be energized immediately following movement of switch contact 122 to its other bistable state, i.e., into contact with switch point 125 thereby forming a circuit traced from battery 116, lead 117, contact point 125, lead 130, solenoid 108, and switch 112 (now closed by spring 115) to ground.

This energizing of solenoid 108 serves to reverse the state of spool 109 in valve 101 whereby pressure is again supplied via line 103.

It will be readily observed that as linkages 78, 79 pass through center, blade 66 will have been raised to its maximum extent and thereafter commence downward movement.

Referring to FIGS. 3, 5, 6 and 7, the actual location of switches 111, 112 and 113, as well as their functions, can now be described relative to the foregoing system description.

Thus, a pair of switches 112, 113 are each provided beneath the lower reach of conveyors 44, 49, respectively, and are supported from a fixed frame plate 126. Each switch 112, 113 is provided with an elongated operating arm 112a, 113a, respectively, whereby the switch will be conditioned to a closed state when struck by linkage 79 so as to condition one of solenoids 107, 108 to its "enabled" state.

As thus arranged, the outer ends of arms 112a, 113a are disposed to be struck by the reciprocating movement of the knuckles formed by the intermediate pivot point 96 (FIGS. 3 and 5) at the end of a forward or reverse stroke, respectively, of actuator 83.

Switch means in the form of switch 111, and an associated operating arm 111a which serves to close switch 111 upon movement of the arm from a neutral position, is disposed upon a standard or support post 127 having an upstanding portion at the side of conveyor 44 and a portion extending transversely above conveyor 44 and serving to dispose switch 111 substantially midway between the side edges of conveyor 44. The lower end of operating arm 111a extends to a position so as to be struck by any sod moving upwardly along conveyor 44 and thereby serves to operate switch 111 at such times.

The cutting arrangement as disclosed herein further includes an anvil member disposed opposite the edge 66a of blade 66 and disposed in the path of sod at a position adjacent the foliage surface of the sod moving along its upwardly inclined path. The blade, therefore, cuts against the anvil as it slices into the sod.

Accordingly, a substantially continuously driven roll 128 of rigid material, such as steel, having surface portions of its periphery disposed to move in a direction common to the direction of movement of the sod and adjacent the foliage has been provided (note the direction of arrow 129).

Thus, roll 128 is mounted upon an axle 131 and is carried in adjustable bearing block assembly 132 at one end and in an adjustable mounting 133 at the other.

Roll 128 is substantially continuously driven by means of a chain belt 134 (FIG. 2) driven from a sprocket 136 mounted on the end of shaft 38 (previously described), whereby rotation of shaft 38 in advancing conveyor 49 also serves to rotate the anvil roll 128 through a slip clutch 137. Slip clutch 137 is carried on the end of axle 131 whereby during the time that blade 66 is urged against roll 128, the rotation of the roll 128 is momentarily arrested so as not to introduce scraping or other damage to the cutting edge 66a of blade 66.

It is readily appreciated that in using an overcenter drive mechanism for actuating blade 66, a major part of each cycle of operation will include a relatively long period when the cutting edge of blade 66 is substantially held motionless at the upper part of its travel before it commences to descend.

During this period, the presence of slip clutch 137 permits the positive driven chain belt 134 to continue to drive while roll 128 may be arrested, thereby protecting blade 66 from damage as might otherwise occur by continuing to drive roll 128 against the sod while blade 66 is engaging, or substantially engaging the surface of roll 128.

Figure 7:
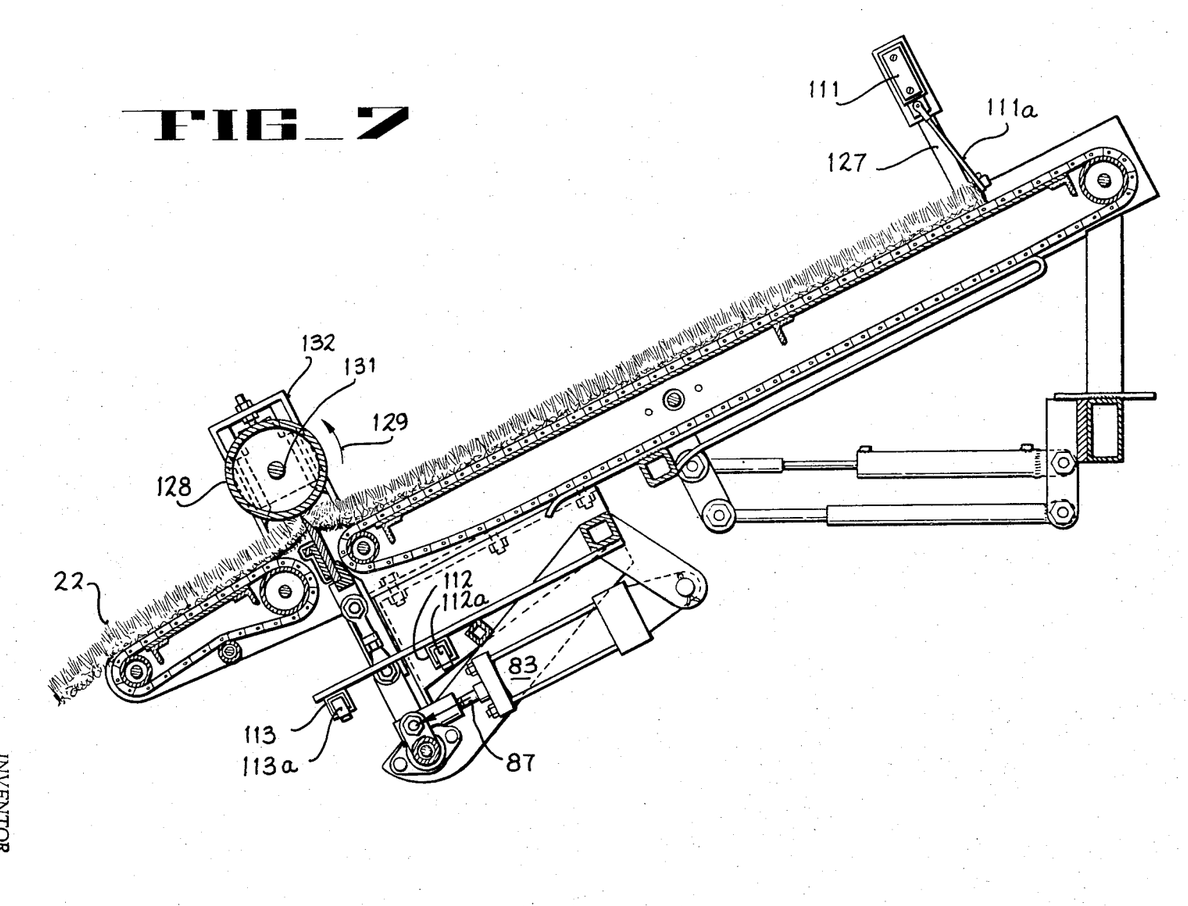
FIG. 7 is an enlarged view comparable to FIG. 3 showing the same mechanism in an active condition cutting a length of sod.

Thus, as shown in FIG. 7, when blade 66 has reached its uppermost position, it will be apparent that roll 128 will be dragged substantially to a stop as permitted by the conditioning of slip clutch 137. Inasmuch as the foliage is compressed against roll 128, there will typically be formed a cushion of foliage between the blade edge 66a and the surface of roll 128 when fully extended upwards. The blade is not required to "cut" through the foliage, since cutting the earthen pad of each slab of sod is sufficient to permit the foliage to be pulled apart by the greater speed of conveyor 44 than 49.

Operation of the machine 10 and particularly the sod conveying and handling assembly 12 and 21 proceeds as now to be described.

As tractor vehicle 11 is driven across a field of precut sod, the sod pick-up assembly 13 engages the leading edge of the sod and nudges it upwardly into the overhanging and rearwardly moving shoes 27 of hold-down carrier 26. This conjoint rearward movement of both carriers 24, 26 serves to capture and feed a ribbon of sod 22 upwardly and rearwardly from the support surface 23 upon which it had previously been lying. Ultimately, the sod arrives upon conveyor 49 and is fed across and through the sod cutting station defined by the sod cutter means which includes the blade 66 disposed at rest on one side of sod 22 and also includes the substantially continuously driven rotating anvil member 128 located on the opposite side of the sod. As sod 22 passes through the cutter station, it will ultimately be picked up and carried further upwardly by means of conveyor 44 and at a rate which tends to overdrive the sod in the sense that the conveyor 44 is moving somewhat faster than the sod can be supplied to it and, therefore, applies a substantial tug to the sod so as to place it in tension during the cutting operation.

Ultimately, the upper end of the ribbon of sod strikes the operating arm 111a of switch 111 whereby one or the other of the two solenoids 107, 108 will be operated to properly condition the four-way hydraulic valve 101 for actuating piston 83a. In the condition shown in the drawings, particularly in FIG. 8, it is to be observed that solenoid 107 would be the one operated by virtue of the fact that the knuckle 96 formed by the pivot points in linkage 79 will have preconditioned switch 113 to a closed state whereby solenoid 107 can be operated upon closure of switch 111.

Having cut the sod into predetermined lengths, the higher speed of conveyor 44 tugs at the severed lengths of sod so as to disentangle any intermingled foliage in the region of the cut made by blade 66.

Thus, it has been found that by using equipment of the kind described herein, it is a considerably easier matter to sever sod by attacking the sod from the root side of the slab rather than attempting to drive a blade through the (usually matted) foliage side of the sod. Accordingly, after having driven the blade relatively easily into the root side of the sod, acting from the root surface of the sod to sever the sod into leading and trailing portions, and moving the portions relatively away from each other to separate intermingled foliage of the two portions. The last step is accomplished by drawing the leading portion along its path relatively away from the trailing portion so as to separate the intermingled foliage.

More particularly, the method referred to above entails in a fuller sense the handling of sod by cutting elongated ribbons of pre-cut sod into predetermined lengths comprising the steps of first lifting the ribbon of sod and then feeding it upwardly from the ground along a predetermined path, slicing into the lifted sod with a cutter acting from the root surface of the sod while disposing an anvil member adjacent the foliage surface of the ribbon so as to cooperate with the cutter in severing the sod into tandemly moving lengths.

More particularly, in order to separate the severed lengths of sod from on-coming sod, the further step is employed of advancing the leading length of sod along its path at a relatively greater rate than the next following length so as to untangle intermingled foliage of the two lengths of sod.

I claim:

1. In a machine for handling sod of a type having foliage on one side thereof, the combination of frame means forming a predetermined path for sod, conveyor means carried by said frame means in said path and serving to convey a ribbon of sod along said predetermined path, means carried by the first named means and disposed in said path for severing the ribbon into predetermined lengths thereof, the last named means including anvil means riding atop the sod, a cutting blade, operating means carried by said frame for reciprocably moving said blade in its own plane between advanced and retracted positions into and out of the sod to sever said ribbon against said anvil, means carried by said frame and disposing said blade on that side of said conveyor means to attack said ribbon initially from that side thereof opposite said foliage and to withdraw from said ribbon via the same side thereof and control means carried by said frame and having a portion in said path to be actuated by the leading edge of said ribbon of sod and serving to actuate said operating means to cause said blade to cut into the ribbon from said side to form first and second separate portions of the sod ribbon.

2. In a machine for handling sod of a type having foliage on one side thereof, the combination of frame means forming a predetermined path for sod, conveyor means carried by said frame means in said path and serving to convey a ribbon of sod along said predetermined path, means carried by the first named means and disposed in said path for severing the ribbon into predetermined lengths thereof, the last named means including a cutting blade movable between advanced and retracted positions in its own plane into and out of the sod, means carried by said frame disposing said blade on that side of said conveyor means adapted to attack said ribbon initially from that side thereof opposite said foliage, said means for severing the ribbon including an anvil member, means supporting said anvil member from said frame in position opposite said blade and above said path at a position adjacent the foliage surface of sod moving in said path, whereby said blade moves into said sod against said anvil, said anvil comprising a roll having surface portions adjacent said sod, means rotatably supporting said roll, means carried by said frame and coupled to substantially continuously drive said roll to move said surface portions in a direction common to that of the sod, means interposed between the last named means and the next to last named means and serving to permit interruption of the driving rotation of the roll when said blade cuts sod thereagainst; and means carried by said frame means serving to move said blade to cut into the ribbon from said side to form first and second separate portions of the sod ribbon.

* * * * *